(12) United States Patent
Laaksonen et al.

(10) Patent No.: US 8,043,463 B2
(45) Date of Patent: Oct. 25, 2011

(54) LABEL LAMINATE AND A METHOD FOR MANUFACTURING A LABEL LAMINATE

(75) Inventors: Vesa Laaksonen, Mataro (ES); Gottfried Philipp, Kist (DE); Andreas Marquardt, Zellingen (DE)

(73) Assignee: UPM Raflatac Oy, Tampere (FI)

( * ) Notice: Subject to any disclaimer, the term of this patent is extended or adjusted under 35 U.S.C. 154(b) by 732 days.

(21) Appl. No.: 10/574,790

(22) PCT Filed: Sep. 24, 2004

(86) PCT No.: PCT/FI2004/000562
§ 371 (c)(1),
(2), (4) Date: Jan. 29, 2007

(87) PCT Pub. No.: WO2005/034065
PCT Pub. Date: Apr. 14, 2005

(65) Prior Publication Data
US 2007/0141287 A1    Jun. 21, 2007

(30) Foreign Application Priority Data
Oct. 6, 2003 (FI) ..................................... 20031448

(51) Int. Cl.
| | |
|---|---|
| *B29C 65/00* | (2006.01) |
| *B32B 37/00* | (2006.01) |
| *B32B 38/10* | (2006.01) |
| *B32B 38/14* | (2006.01) |
| *B32B 7/14* | (2006.01) |
| *B32B 9/00* | (2006.01) |
| *B32B 33/00* | (2006.01) |
| *B32B 27/14* | (2006.01) |

(52) U.S. Cl. ....... 156/291; 156/247; 156/277; 428/40.1; 428/198; 283/81

(58) Field of Classification Search ..................... 156/60, 156/247, 277, 290, 291, 295; 428/40.1, 41.8, 428/42.2, 42.3, 195, 198, 201, 202, 203, 428/195.1; 283/81
See application file for complete search history.

(56) References Cited

U.S. PATENT DOCUMENTS

| | | |
|---|---|---|
| 4,768,810 A | 9/1988 | Mertens |
| 5,284,689 A | 2/1994 | Laurash et al. |
| 5,700,536 A * | 12/1997 | Steidinger ..................... 428/40.1 |
| 5,707,713 A * | 1/1998 | Langan et al. ............. 428/195.1 |
| 6,270,870 B1 | 8/2001 | Chess |

(Continued)

FOREIGN PATENT DOCUMENTS

EP         353972 A1 *  2/1990

(Continued)

*Primary Examiner* — Philip Tucker
*Assistant Examiner* — Brian R Slawski
(74) *Attorney, Agent, or Firm* — Venable LLP; Eric J. Franklin

(57) ABSTRACT

A label laminate and a method for manufacturing a label laminate. The laminate includes a first label material layer and a second label material. The method includes forming a pattern in which adhesive areas and non-adhesive areas alternate on the face side of the first label material layer and on the face side of the second label material layer. The adhesive areas on the first label material layer are aligned with the non-adhesive areas on the second label material layer and the non-adhesive areas on the first label material layer are aligned with the adhesive areas on the second label material layer. The face sides of two label material layers are attached to each other. The adhesive areas are formed by a screening method. The non-adhesive areas have a surface energy, which is at least 25 dynes.

2 Claims, 1 Drawing Sheet

U.S. PATENT DOCUMENTS

2001/0030020 A1 * 10/2001 Nandy et al. .................. 156/289
2002/0022102 A1 * 2/2002 Kiyohara et al. ............ 428/40.1

FOREIGN PATENT DOCUMENTS

| | | | |
|---|---|---|---|
| EP | 0512153 | A2 | 11/1992 |
| EP | 0552656 | A2 | 7/1993 |
| EP | 1229509 | A2 | 8/2002 |
| GB | 1408612 | A | 10/1975 |
| GB | 1 420 743 | * | 1/1976 |
| GB | 1420743 | * | 1/1976 |
| GB | 1420743 | A | 1/1976 |
| WO | WO9703839 | A1 | 2/1997 |

* cited by examiner

LABEL LAMINATE AND A METHOD FOR MANUFACTURING A LABEL LAMINATE

CROSS-REFERENCE TO RELATED APPLICATIONS

This application claims priority to Finnish patent application 20031448 filed 6 Oct. 2003 and is the national phase under 35 U.S.C. §371 of PCT/FI2004/000562 filed 24 Sep. 2004.

FIELD OF THE INVENTION

The present invention relates to a label laminate and a method for manufacturing a label laminate. The laminate comprises a first label material layer and a second label material layer. Each label material layer has a face side and a back side. The method comprises forming a pattern in which adhesive areas and non-adhesive areas alternate on the face side of the first label material layer and on the face side of the second label material layer, aligning the adhesive areas on the first label material layer with the non-adhesive areas on the second label material layer and aligning the non-adhesive areas on the first label material layer with the adhesive areas on the second label material layer and attaching the face sides of the two label material layers to each other.

BACKGROUND OF THE INVENTION

Publication EP 1229509 discloses a laminate including duplex labels laminated together by patches of adhesive alternating oppositely therebetween. The labels may be removed from each other, with each label having adhesive on the back side thereof. When an adhesive patch is intended to be on the surface of the first label then there is a silicone release layer between the adhesive patch and the surface of the second label.

Publication WO 97/03839 discloses a method and an apparatus for hot-melt printing. The invention can be utilized e.g. for delivering adhesive patterns to a web material. One example is a zone coated label stock.

A problem related to patch-like adhesive patterns is that opposite to the patch there must be a patch-like release layer, which makes the manufacturing process complicated. It is also desirable to get rid of silicone release agents because-of-their high price. On the other hand, the use of the release agents has been compulsory because otherwise there is no possibility to release different layers from each other. A presence of the silicone release agent is detected for example by a surface energy measurement and the obtained value is between 20 and 22 dynes.

SUMMARY OF THE INVENTION

The laminate of the invention is characterized in that the non-adhesive areas have surface energy, which is at least 25 dynes. The method of the invention is characterized in that the adhesive areas are formed by a screening method, and the adhesive areas on the first label material layer are attached directly to the non-adhesive areas on the second material layer and the non-adhesive areas on the first label material layer are attached directly to the adhesive areas on the second material layer, the non-adhesive areas having surface energy, which is at least 25 dynes.

The laminate of the invention can be manufactured without forming a silicone release layer or the like. Therefore complicated process steps and use of expensive silicone release agents can be avoided. Further, the new technique allows new ways of applying adhesive areas.

The laminate of the invention can be used for example for double-sided printing. The back sides of the label material layers can be printed and the label material layers can be released from each other and attached to another surface. The laminate is useful for example as a printing substrate for digital photographs. The laminate may have several separate printable labels on both sides of the laminate.

The laminate of the invention comprises a first label material layer and a second label material layer, which are attached together. The label material layers are preferably of paper but also other substrates, such as plastic films, can be used. The substrate is, of course, selected according to the intended use. When the substrate is paper it can be coated throughout with polyolefin material, preferably polyethylene. When the substrate is plastic material it can be a single layer of polyolefin, such as polyethylene film, or it can be a multi-layer structure, such as a coextruded film.

The both label material layers comprise adhesive areas and non-adhesive areas. When the first and the second label material layer are attached together to form a laminate they are before that aligned in such a manner that the adhesive areas on the first label material layer and the non-adhesive areas on the second label material layer, and the non-adhesive areas on the first label material layer and the adhesive areas on the second label material layer are opposite to each other in the ready laminate. The adhesive areas and the non-adhesive areas may be equal in size, or the non-adhesive areas can be slightly larger than the adhesive areas.

The adhesive areas are formed by a screening method, preferably by the rotary screen method. The screening method is a method in which adhesive is applied on the substrate through a screen or a mesh. Due to the screen, there is at least a slight grid pattern in the adhesive area. In other words, the topography of the adhesive area varies. Depending on the used screen, there may be ridges and recesses on the adhesive layer, or the adhesive layer may be formed of separate dots. The adhesive area may be even a single dot if the adhesive and non-adhesive areas alternate in short distances.

The non-adhesive areas between the adhesive areas remain as such. In other words, the surface of the basic substrate forms the surface of the non-adhesive area. The surface energy of the non-adhesive area is higher than 22 dynes, normally at least 25 dynes. In practice it means that there is not any common release layer, such as a silicone layer (the surface energy of the silicone release layer is typically between 20 and 22 dynes). There may be a polyethylene coating, which surface energy is typically around 30 dynes. The mentioned values of the surface energy are measured by a method described in DIN 53364 or ASTM D 2578-67.

The reason why there is no need for a conventional release layer is that the adhesive areas are formed by the screening method. The screening method produces three-dimensional dots, which protrude from the plain of the material layer. The dots may or may not be in contact with other dots. The area of the dot, which is contact with the material layer on which it is formed, is larger than the area of dot, which is in contact with the other material layer. Strong adhesion of the dot to the surface on which it is formed and on the other hand releasability from the other surface are based on two facts; It is due to the above-mentioned contacting surface areas and the fact that the dot is formed directly to the intended surface. The adhesive areas are formed of hot melt adhesives known as such. The strong adhesion is at least partly due to the properties of the hot melt adhesives; The hot melt adhesives have a substantially low viscosity during screening and are thus able to adhere firmly to the surface of the label material layer. The shape of the adhesive can be any suitable shape, such as rectangle, square, or circle.

BRIEF DESCRIPTION OF THE DRAWINGS

In the following, the invention will be described by examples and figures in which.

The figures show only principles. Dimensions shown in the figures are not on the natural scale, and the number of the dots in the adhesive areas is much higher in reality.

DETAILED DESCRIPTION OF EMBODIMENTS OF THE INVENTION

Figure 1B:
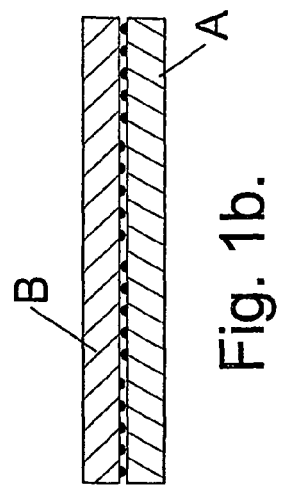
FIG. 1b shows the first and the second label material layers as attached in a cross-sectional view C-C.
Figure 1A:
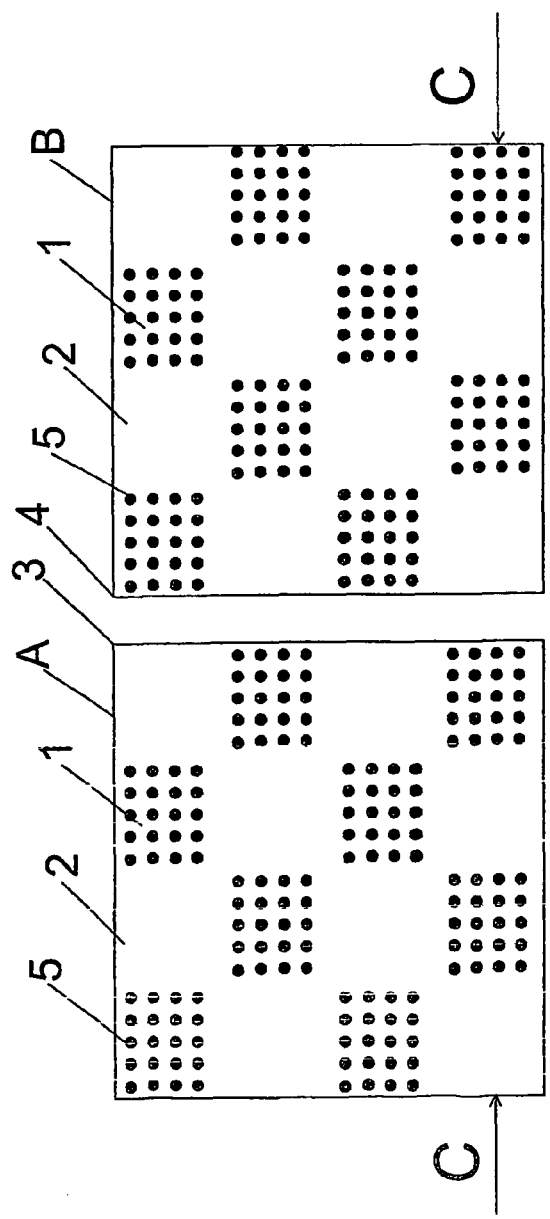
FIG. 1a shows the first and the second label material layers according to an embodiment of the invention in a top view.

In FIG. 1a, adhesive areas 1 are formed on the first label material layer A and the second label material layer B by a screening method. The adhesive areas 1 comprise a group of adhesive three-dimensional dots 5, which are convergent to their top (see FIG. 1b). Non-adhesive areas are denoted by the number 2. When the first label material layer A and the second label material layer B are attached together, the left side 4 of the layer B is turn on the right side 3 of the layer A in such a manner that the adhesive areas 1 on the first label material layer A and the non-adhesive areas 2 on the second label material layer B become aligned, and the non-adhesive areas 2 on the first label material layer A and the adhesive areas 1 on the second label material layer B become aligned. The non-adhesive areas 2 have a surface energy, which is at least 25 dynes. It is possible that the surface energy is even equal or higher than 30 dynes.

FIG. 1b shows a cross-sectional view of the laminate of the invention.

As seen from the figure, the three-dimensional dots 5 of hot melt adhesive have a larger diameter on the surface of the label material layer than on the top of the dot. Screening methods, such as the rotary screen method, form such a shape.

EXAMPLE

Paper, which had an extruded polyethylene layer (20 g/m$^2$) on its surface (Wisajet Silk 180, Walki Wisa Oy, Finland) was used as a first label material layer and a second label material layer. Adhesive areas were formed by a rotary screen method to the polyethylene side of the paper. The used screen was a 125-mesh screen. The used adhesive was a hot melt adhesive (Ipatherm S 95/10, Fuller, USA). Non-adhesive areas were untreated polyethylene surfaces. The first label material layer and the second label material layer were attached to each other to form a laminate.

The force, which is needed to separate the two label material layers from each other (release strength) was measured 4 weeks after manufacturing of the laminate. The speed used for separating was 300 mm/min. The measured force was 80 cN/25 mm.

The adhesion strength was measured from the separated first and second label material layers. They were attached to a glass plate, a steel plate and a polyethylene plate, and peeled off one week later. The peeling speed was 300 mm/min and the peeling angle was 180°. The measured forces were 50 cN/25 mm, 50 cN/25 mm and 30 cN/25 mm, respectively.

The above-mentioned figures and example do not restrict the scope of the invention.

The invention claimed is:

1. A method for manufacturing a printable label laminate without a release layer, the laminate comprising a first label material layer and a second label material layer, each label material layer having a face side and a back side, the method comprising:

forming adhesive areas directly on a surface of an intended label material layer and leaving untreated adhesive-free areas on the surface, each adhesive area comprising a group of three-dimensional adhesive dots by a screening method so that a pattern is formed in which the adhesive areas and non-adhesive areas alternate on the face side of the first label material layer and on the face side of the second label material layer;

aligning the adhesive areas on the first label material layer with the non-adhesive areas on the second label material layer and aligning the non-adhesive areas on the first label material layer with the adhesive areas on the second label material layer; and attaching the face sides of two label material layers to each other so that the adhesive areas on the first label material layer are attached directly to the non-adhesive areas on the second material layer and the non-adhesive areas on the first label material layer are attached directly to the adhesive areas on the second material layer, wherein an area of the adhesive dots that contacts the material layer on which the adhesive dots are formed is larger than an area of the dots that contacts the non-adhesive areas on the other material layer to which the dots are attached, and wherein the non-adhesive areas having surface energy, which is at least 25 dynes.

2. The method according to claim 1, wherein the screening method is the rotary screen method.

* * * * *